Jan. 7, 1969    M. MASLOW    3,420,401
DETACHABLE HANDLE CONSTRUCTION FOR DISHES
Filed Aug. 29, 1967
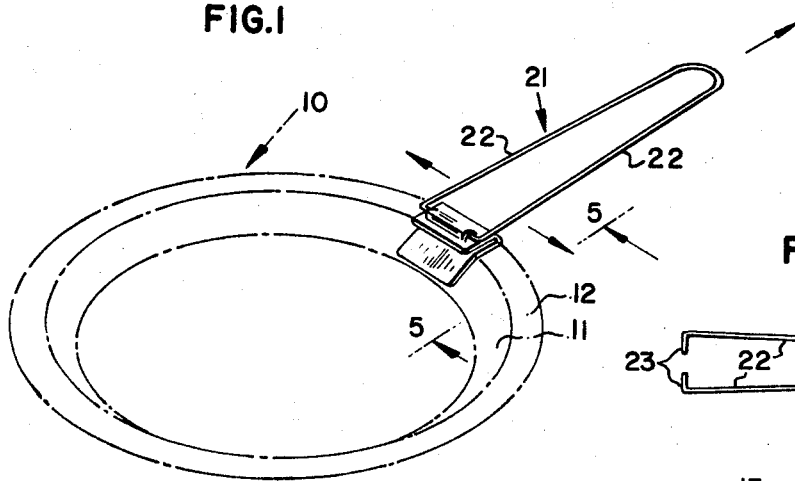
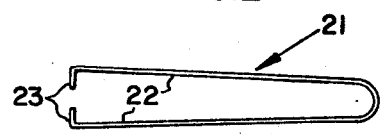
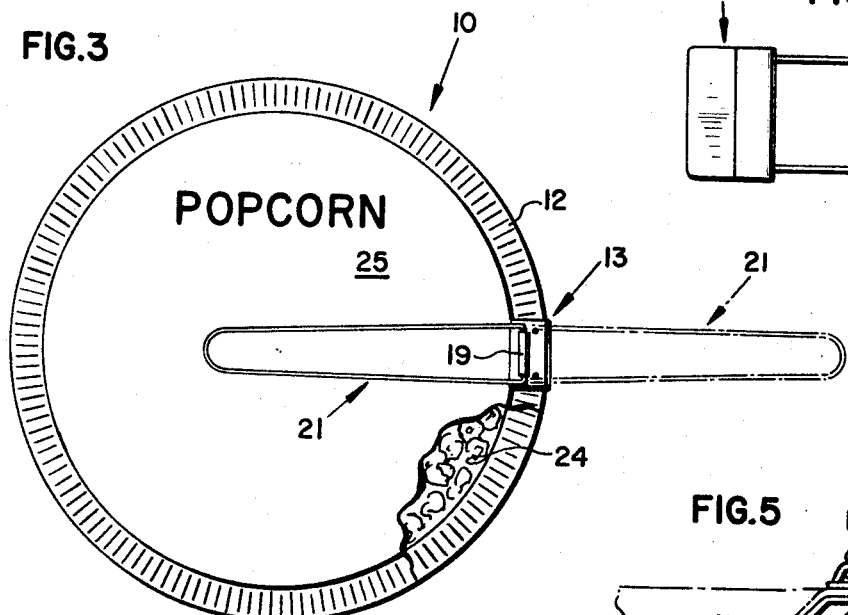
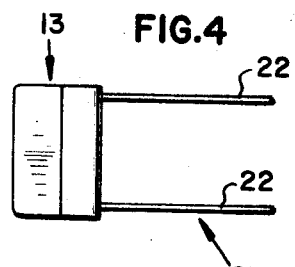
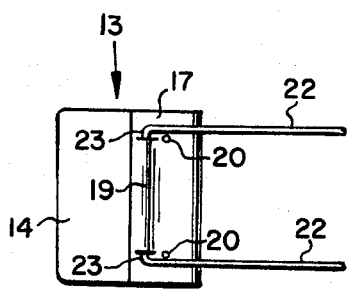
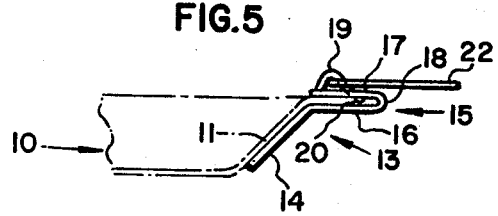
*INVENTOR.*
MAC MASLOW
BY F. Ledermann
ATTORNEY

United States Patent Office 3,420,401
Patented Jan. 7, 1969

3,420,401
DETACHABLE HANDLE CONSTRUCTION FOR DISHES
Mac Maslow, 209 Mallory Ave., Jersey City, N.J. 07304
Filed Aug. 29, 1967, Ser. No. 664,065
U.S. Cl. 220—95
Int. Cl. B65d 25/28
4 Claims

ABSTRACT OF THE DISCLOSURE

The invention provides a two-part handle construction wherein a first part is a bracket clamped to an edge of the dish and the second part is a detachable yoke-shaped handle pivotally secured to the bracket. Such a dish as marketed contains prepared food adapted to be heated, baked, roasted or the like. Normally such a dish has a handle laid flat across the top or cover thereof, and when ready, for example, to be placed in an oven the handle is swung outward to extend substantially radially from the dish. However, as a consequence of the ready attachability and detachability of the instant handle, where two or more such dishes are sold as or in a single package, each dish is provided with a bracket whereas but one handle need be supplied for all the dishes.

---

Dishes of the type to which the instant invention is applicable usually have the general appearance of a pie plate or at least have an upwardly extending circumferential wall surmounted by an outwardly extending horizontal flange. The invention is applicable equally to dishes wherein the circumferential wall extends vertically from the base of the dish and dishes wherein the said wall tapers in a downward direction with respect to the said base.

Referring briefly to the drawing, FIG. 1 is a perspective view of the two-part handle construction of the present invention, showing also, in phantom, the outline of a dish to which it is attached.

FIG. 2 is a top plan view of the detachable yoke or handle per se.

FIG. 3 is a top plan view, with parts broken away and partly in section, showing the handle folded down upon the cover of the dish.

FIG. 4 is a fragmentary bottom plan view of the handle construction per se.

FIG. 5 is a view taken on the line 5—5 of FIG. 1.

FIG. 6 is a fragmentary top plan view of the handle construction per se.

Referring in detail to the drawing, the numeral 10 designates a dish which is shown, merely by way of example, circular in conformation and having the general shape of a pie plate. Most dishes of this sort, regardless of their shape, are usually made wholly or partly of aluminum.

The dish 10 is shown having a downwardly tapering circumferential wall 11 surmounted by an outwardly extending substantially horizontal flange 12. The bracket portion of the two-part handle construction is shown at 13 to consist of a deformed thin flat plate or sheet preferably made of a metal such as, for example, tin.

The bracket illustrated has a downwardly sloping lower portion 14 which, when mounted on the dish shown at 10, rests against the tapering wall 11; the thickness of both the dish and the bracket is exaggerated in the drawing. From the upper end of the portion 14 a doubled-back horizontal portion 15 extends. The portion 15 is thus composed of two jaws 16 and 17 joined by the bight 18 and spaced vertically apart a short distance. The portion 15 has a length such that the flange 12 of the dish may register between the said jaws.

An upwardly extending transverse loop or sleeve 19 is punched out of the jaw 17 and has a length shorter than the width of the jaw; the ends of the sleeve are positioned spaced from the opposed longitudinal edges of the jaw.

The bracket 13 as so far described may readily be mounted on the dish in the position shown in FIG. 5. It may be clamped tight on the flange 12 by a simple pressing operation, bringing the jaws 16 and 17 together against the flange. However, in order to enhance the attachment of the bracket to the dish, two or more detents 20 are punched downward in the jaw 17, whence the material punched out will project downward as shown in FIG. 5. Thus, when the jaws 16 and 17 are pressed together about the softer flange 12, the downwardly extending detent material will penetrate the flange and serve to lock it more securely to the flange. The detents may thus be deemed to provide downwardly extending spikes on the jaw 17.

The handle portion per se of the instant construction consists of a yoke 21 of resilient material, whose arms 22 are normally urged toward each other. At their extremities the arms are deformed to provided aligned inwardly extending tips or prongs 23 which are readily insertible, in an obvious manner, into the opposed ends of the sleeve 19 to attach the handle pivotally to the bracket 13. It is to be noted that the sleeve 19 is positioned substantially at or close to the free end of the jaw 17, that is, remote from the bight 18. Hence, when the handle 21 is swung from its position shown in full lines in FIG. 3 to that shown in FIG. 1, the arms 22 of the handle are stopped by, and rest upon, the top surface of the jaw 17, thereby stabilizing the handle for lifting the dish.

In FIG. 3 any contents which the dish may contain is shown by way of example at 24, and such contents is covered or sealed by a cover 25 bearing legends or printed matter relating to the contents.

It is apparent that when a single handle is packaged together with two or more dishes each of which is provided with a bracket 13 attached thereto, the handle may be used selectively on each bracket, thus providing economy as compared with providing a handle on every dish.

I claim:

1. In combination with a dish having an upwardly extending circumferential wall surmounted by an outwardly extending substantially horizontal flange, a two-part handle construction including a bracket secured to the dish comprising a deformed plate of sheet material, said plate including a lower portion and a doubled-back upper portion, said lower portion extending downward at an angle to the horizontal complementary to the angle of said wall to the horizontal and engaging the outer surface of said wall, said upper portion extending radially outward with respect to said dish and including two vertically spaced jaws the lower jaw of which extends outward from the upper end of said lower portion of the bracket, the upper jaw of said jaws having a transverse sleeve on the top thereof, said flange registering between said jaws, said handle comprising a resilient yoke provided with aligned prongs on the extremities of the arms thereof, said prongs registering detachably and pivotally in the ends of said sleeve.

2. A combination according to claim 1, said sleeve having a length smaller than the width of said upper jaw, the ends of said sleeve being spaced at equal distances from the opposed longitudinal edges of said upper jaw.

3. A combination according to claim 2, said sleeve being spaced distant from the radially outermost end of said upper jaw.

4. A combination according to claim 3, said upper jaw having spaced detents punched downward through the top thereof thereby providing downwardly extending spikes engaging said flange.

References Cited

UNITED STATES PATENTS 1,355,332  10/1920  Hanson _____ 16—114
1,367,757  2/1921   Schott _____ 16—114

EVON C. BLUNK, Primary Examiner.

R. D. GUIOD, Assistant Examiner.

U.S. Cl. X.R.

16—114; 294—33